Oct. 10, 1950     A. W. KINGSTON     2,525,552
PICTURE PROJECTION EQUIPMENT

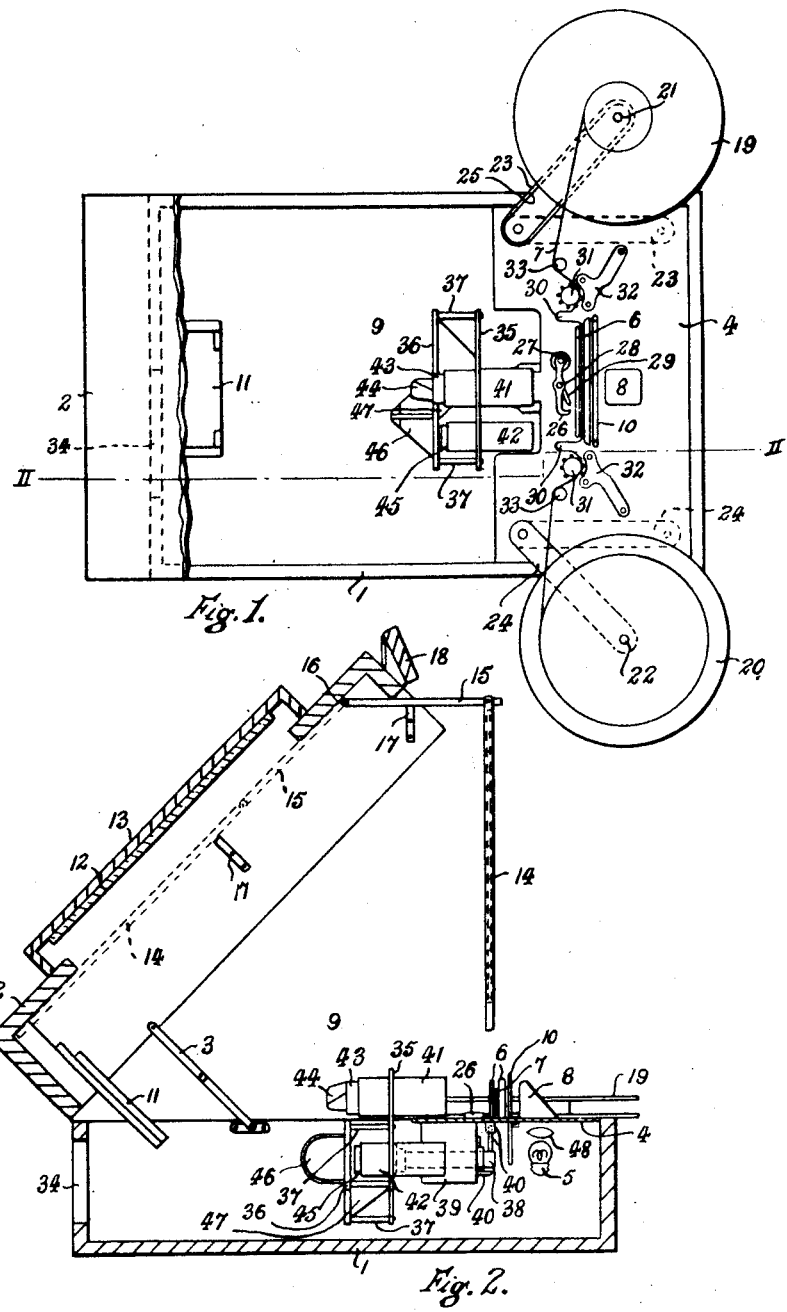

Filed Dec. 24, 1947     2 Sheets-Sheet 2

INVENTOR
ARTHUR WILLIAM KINGSTON
BY Otto Munk
HIS ATTY

Patented Oct. 10, 1950

2,525,552

UNITED STATES PATENT OFFICE 2,525,552

PICTURE PROJECTION EQUIPMENT

Arthur William Kingston, Denham, England

Application December 24, 1947, Serial No. 793,657
In Great Britain December 31, 1946

8 Claims. (Cl. 88—24)

1

The present invention relates to picture projection equipment, primarily for use in cinematograph film projection using films of the sub-standard type i. e. 8, 9.5 and 16 m. m. films as used for example in the home and usually, though not invariably including sound reproducing means for a sound accompaniment.

The equipment forming the subject of the invention is however also intended for use in the projection of still pictures.

Projection equipment of this kind as at present in use is constructed on generally similar lines to those of the standard 35 m. m. equipment employed in cinema theatres, and usually includes three main items, the picture projector and sound reproducer, a screen and one or more loud speakers, the film spools being arranged for rotation in vertical planes and the film being fed vertically past the gate of the projector.

The operations involved in preparation and setting-up before using such home cinema equipments are somewhat involved and tedious and occupy much time.

The primary object of the present invention is to provide a set of cinematograph equipment in portable or readily transportable form offering the choice to the user of the alternatives of projecting after rapid and easy set-up, upon a relatively small screen carried by the casing of the portable or transportable equipment, or projecting on to a larger and separate screen located away from the casing.

The apparatus according to the invention, comprises a portable or transportable case including a movable lid, a picture projector mounted within the case at one end thereof, a translucent screen adapted to be supported in a general vertical plane from a part of the case when the latter is open for use, one or a number of successively reflecting mirrors in the optical path between a picture gate and the back of the translucent screen when in use, an aperture in the wall of the casing opposite the projector and a movable structure including alternative optical systems for the projector, said structure being movable between two set positions within the casing whereby pictures may be projected either by one of the optical systems over the mirror path onto the said translucent screen or by the other optical system through the aperture in the wall of the case onto a separate screen distant from the case.

Sound amplifying means and a loud speaker when required, may also be mounted within the case.

2

According to a further feature of the invention the spindles for the film spools are mounted vertically in the case or upon arms or equivalent supports movable between positions in and out of the case, the film being arranged to move horizontally between the spools and in a vertical plane past the projector, erecting means being provided in the optical systems to rotate the pictures in the plane of the images through an angle of 90°.

One embodiment of the invention is illustrated by way of example in the accompanying drawings in which Fig. 1 is a view in plan of the improved projection apparatus in the position for use, the lid being partly omitted.

Fig. 2 is a view in sectional side elevation on the line II—II of Fig. 1.

Figure 3:
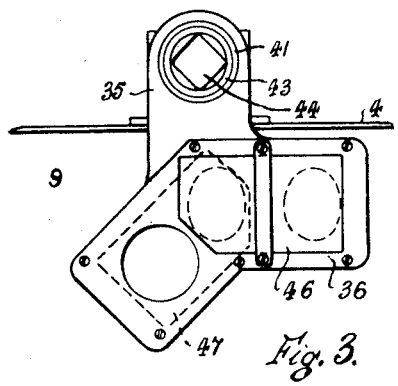
Figs. 3 and 4 are views in end elevation and on a larger scale showing the structure including the two optical systems, in the two alternative positions.
Figure 4:
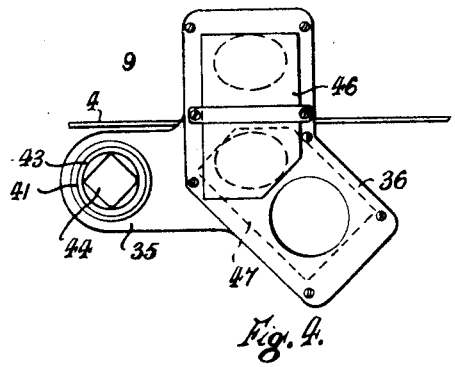

Referring to the drawings, the equipment is contained in a casing comprising a box 1 of generally rectangular form and of a size approximating to that of the well known portable gramophone, a hollow lid 2 being hinged at one narrow end of the box 1 and a lid stay 3 being provided to fix the lid 2 at an appropriate angle usually about 45°, to the base of the box 1 when the lid is in the open position.

At the opposite end of the box 1 from the hinged lid is mounted a fixed platform 4 and in the space in the box 1 below this platform 4 is mounted a projection light source 5 and a driving motor of any convenient and well known form (not shown) for driving the film and other usual moving parts in synchronised relationship.

Upon the upper side of the platform 4 is mounted a film gate 6 disposed so that the film 7 may pass through it transversely or from one vertical side of the gate to the other, and in a generally vertical plane.

In an aperture in the platform 4, at the side of the gate 6 away from the lid 2 and immediately over the light source 5 is mounted a condensing lens 48 and a totally reflecting prism 8 arranged to direct reflected light from the source 5 horizontally through the optical projection system 9. Between the film gate 6 and the prism 8 and in a slot in the platform 4, is mounted the usual shutter 10 rotatable on a bearing carried on the underside of the platform 4 and driven through any convenient form of geared transmission from the motor and in synchronism with the film feed.

In the end of the lid 2 nearest the box 1 is fixed a plane mirror 11 the position of which, when the apparatus is in operation making use of said mirror the incident angle for light convergent upon said mirror from the optical system is approximately 45°. When the lid 2 is in the closed position the mirror 11 lies within the box 1 and close to the end wall thereof. With the lid 2 open the lower edge of the mirror projects a short distance only into the box 1.

The end wall of the box 1 beneath the mirror 11 is provided with an aperture 34 which may be of rectangular form and extending over the whole or the greater part of the height of said end wall but being disposed closer to one side of the box than the other. A movable shutter (not shown) may be provided to close said aperture when not in use.

At the underside of the top of the lid 2 is affixed a second plane mirror 12 in a plane at right angles to the mirror 11. In the case illustrated the lid 2 is shown as being provided with a shallow recessed portion or turret 13 housing the mirror 12, such an arrangement serving to protect the mirror 12 in the event that the lid 2 is allowed to fall accidentally.

At the free end of the lid 2 is carried a projection screen formed of a sheet of translucent material carried in a light metal frame 14 pivotally connected at one edge to a pair of light-weight metal bars 15 themselves pivoted to the side walls of the lid 2 near the free end thereof as shown at 16.

The dimensions of the screen frame 14 and the bars 15 are determined so that they may be stowed in the lid in a position in which they lie close to the under surface of the top of the lid 2 as shown in dotted lines in Figure 2, the screen frame 14 being a snug fit across the width of the lid, whilst in the open position the bars 15 project from the lid as shown in full lines in Figure 2 with the screen depending vertically from the ends thereof.

The screen and supporting bars are retained in the open and stowed position by means of spring clips 17 the free ends of which are biassed inwards but are capable of being depressed into small depressions in the walls of the lid by light finger pressure.

In the case illustrated the free end wall of the lid is divided to provide a hinged edge flap 18 capable of being folded back externally as shown in Fig. 2 to permit the bars 15 to be pivoted close to the end of the lid and to take a horizontal open position so that a screen of maximum height may be used and the desired position of the screen relative to the mirror 12 to be achieved.

The winding on and winding off film spools 19 and 20 are mounted for rotation in a horizontal plane, one at each side of the box 1, being carried upon vertical spindles 21 and 22 provided at the ends of two arms 23 and 24 themselves mounted upon the platform 4 so as to be capable of being swung between one position in which they extend outwards as shown partly in full lines in Fig. 1 and in another and inner position as shown in dotted lines in that figure where they can be accommodated within the closed case.

The winding on spool 19 is driven e. g. through a belt 25 from the motor at a speed appropriate to the feed speed of the film 7 through the gate 6.

The step by step movement of the film through the gate is imparted by a reciprocating and rocking hook feed device 26 of well known kind adapted to engage the usual apertures in the edge of the film in succession. In the improved apparatus according to the invention the hook 26 is reciprocated in a horizontal plane, the tail of the hook being pivoted eccentrically on a rotating disc 27 driven at appropriate speed by the motor, and a pin 28 being provided intermediate the ends of the hook for engagement in a guide slot 29 in the platform 4 whereby the hook is rocked and engaged with and disengaged from the film during its reciprocating movement, to move the film intermittently past the projector in the usual manner.

Loops 30 are maintained in the film at each end of the gate, by engagement of the film with toothed sprockets 31 also driven at appropriate synchronised speed by the motor of the machine, the film being held up to the sprockets 31 by spring loaded fingers 32.

The film 7 is thus fed horizontally in a vertical plane past the projector and this arrangement makes for compactness and also much facilitates the operation of threading the film which may be carried out in the usual manner, or the loop forming spring loaded fingers 32, guide rollers such as 33, and the opening and closing portion of the gate may be arranged to be moved by a single lever.

The projector structure 9 comprises a pair of metal plates 35 and 36 arranged parallel to one another in vertical planes and rigidly connected with one another by means of hollow spacing sleeves 37 screwed at each end. The plate 35 at its centre is rigidly connected with a horizontal spindle 38 mounted for rotation through an angle of 90° in a bearing block 39 secured to the underside of the platform 4, stops 40 being provided on the spindle and on the block to determine the extreme positions of the structure about the axis of the spindle.

In the plate 35 nearest the prism 8 are mounted two horizontal sleeves 41 and 42 the axes of which are equidistant from the axis of the spindle 38 and spaced from one another by 90° around said spindle 38 and the arrangement is such that either one or the other of said sleeves may be brought into axial alignment with the axis of the light path from the prism 8.

In the sleeve 41 is mounted a short focus optical system comprising a tube 43 which is a friction fit within the sleeve 41 and mounting an object lens and an erecting prism 44 whereby the pictures which are on their sides in the gate of the projector are erected by rotation through 90° in the image plane before being directed on to the first mirror 11.

The erecting prism 44 is an elongated right-angle prism and the inclined end surfaces are disposed in planes at 45° to both the vertical and the horizontal. The required position of the erecting prism and focusing are both achieved by adjustment of the tube 43 within the sleeve 41.

In the second sleeve 42 is mounted a tube 45 mounting a long focus lens system. The front plate 36 is provided with an aperture in register with the forward end of tube 45, and in front of said aperture in plate 36 is mounted a totally reflecting prism 46 fixed to the plate 36 with its hypothenuse face in contact therewith. The prism 46 is so mounted in the plate 36 that with the tube sleeve in the optical path from prism 8 the inclined surfaces are immediately above and below one another i. e. they lie in planes making an angle of 45° with the horizontal.

At the opposite or rear side of the plate 36 is mounted a second and similar totally reflecting prism 47, disposed with the hypothenuse face in contact with the plate. The hypothenuse faces of the two prisms overlap and the plate 36 is apertured between the overlapping parts so that light emerging from the first prism 46 is directed on to the second prism. The second prism 47 is mounted on the plate 36 in a position rotated relative to the first prism 46 by an angle of 45° in the hypothenuse plane of either prism. The plate 36 is provided with a third aperture opposite the outer emergent portion of the hypothenuse surface of prism 47. With this arrangement, the pictures on their sides in the gate of the projector are rotated through an angle of 90° in the image plane by the second prism 47.

With the apparatus in use and employing the translucent screen in frame 14 suspended from the open lid of the box, the rotatable projector structure 9 is moved to the position with the short focus optical system in sleeve 41 aligned with the gate 6 and the prism 8. The images, erected by the erecting prism 44 are directed onto the first mirror 11 and reversed reflected images from mirror 11 directed upwards on to mirror 12 in the lid 2. The corrected reflected images from mirror 12 are directed horizontally forwards on to the back of the translucent screen and are viewed from the front.

When it is desired to project larger pictures on to a screen distant from the case, the rotatable projector structure 9 is rotated to bring the long focus optical system in sleeve 42 into the position of alignment with the gate 6 and prism 11, in which position the emergent face of the second totally reflecting prism 47 of structure 9, is offset from the line between prism 8 and the mirror 11 and faces the aperture 34 in the end wall of the box 1.

In this case images of the pictures on their sides in the gate 6 are transmitted by the long focus system in tube 45 and the totally reflecting prisms 46 and 47 being reversed and corrected alternately at the four reflecting surfaces of the two prisms and being rotated through 90° in the image plane by the second prism 47 and projected through the aperture 34 in form for direct viewing at the front of the distant screen.

Thus an apparatus is provided which is easily and quickly set up for use and remains very compact when required to be used for the entertainment of a small number of persons for whom a small screen is adequate and which can readily be changed for the purpose of projecting onto a larger remote screen. As an example a small translucent screen 12 inches by 9 inches has been found suitable for home use.

Whilst in the examples described and illustrated the first mirror 11 is fixed in relation to the lid, it may in some cases be of advantage to arrange said mirror to be hinged to or even removable from the lid thus affording greater latitude in the location of the aperture 34 in the wall of the box 1.

When projecting pictures with sound accompaniment on to a distant screen a supplementary loud speaker may be provided near the distant screen and connection means provided for connecting said loud speaker with the sound reproducing means in the portable casing.

Whilst the apparatus described and shown is particularly intended for use with films of sub-standard widths it will be understood that by the use of parts of appropriate size and larger optical systems, normal 35 m. m. films may be projected.

Again, the improved apparatus is described above as being used with films in which the pictures are arranged in the normal manner on the film, that is to say with the top and bottom edges of the picture frames at right angles to the film edges. Films may however be produced with the pictures disposed so that the top and bottom edges of the picture frames are parallel with the edges of the film. With such films, fed horizontally and in a vertical plane as previously described, the film pictures will be upright in the gate and optical projection can be carried out without the need for the erection or partial erection of the projected images.

The improved apparatus may also be used for the projection of still pictures.

I claim:

1. Picture projection apparatus comprising a portable case having an apertured wall and including a lid movable between open and closed positions, a picture projector including a picture gate, mounted within the case, a translucent screen adapted to be supported in a general vertical plane from a part of the case when the latter is open for use, a plurality of mirrors disposed within the case and adapted to form a mirror light path between the picture gate of the projector and the back of the translucent screen when the latter is disposed in said supported position, and a movable structure within the casing including two alternative optical systems for the projector, each of which optical systems can be brought into register with the picture gate and one of said optical systems being adapted to project light emerging through the picture gate on to the mirror path leading to the translucent screen and the other optical system including means to divert light emerging from the picture gate into a path which is offset from and avoids said first mentioned mirror light path and passes through the aperture in the wall of the case on to a separate screen distant from the case.

2. Picture projection apparatus comprising a portable case having an apertured wall and including a lid movable between open and closed positions, a picture projector including a picture gate, mounted within the case, a translucent screen adapted to be supported in a general vertical plane from a part of the case when the latter is open for use, at least two successively reflecting mirrors disposed within the case and adapted to form a mirror light path between the picture gate and the back of the translucent screen when the latter is disposed in said supported position, a movable structure within the casing including two alternative optical systems for the projector, each of which optical systems can be brought into register with the picture gate and one of said optical systems being adapted to project light emerging through the picture gate on to the mirror path leading to the translucent screen and the other optical system including means to divert light emerging from the picture gate into a path which is offset from and avoids said first mentioned mirror light path and passes through the aperture in the wall of the case on to a separate screen distant from the case, and means for determining two set positions of said movable structure in which one or other of said two alternative optical systems is located in register with said picture gate.

3. Picture projection apparatus comprising a portable case having an apertured wall and including a lid movable between open and closed positions, a picture projector including a film gate, mounted within the case, a translucent screen adapted to be supported in a general vertical plane from a part of the case when the latter is open for use, a plurality of mirrors disposed within the case and adapted to form a mirror light path between the film gate of the projector and the back of the translucent screen when the latter is disposed in said supported position, film spool supports adapted to support the spools for rotation in horizontal planes at each side of the film gate, means for feeding a film horizontally and in a vertical plane, a movable structure within the casing including two alternative optical systems for the projector, each of which optical systems can be brought into register with the film gate and one of said optical systems being adapted to project light emerging through the film gate on to the mirror path leading to the translucent screen and the other optical system including means to divert light emerging from the film gate into a path which is offset from and avoids said first mentioned mirror light path and passes through the aperture in the wall of the case on to a separate screen distant from the case, and means in each of said optical systems for rotating the images through 90° in the image plane.

4. Picture projection apparatus comprising a portable case having an apertured wall and including a lid movable between open and closed positions, a picture projector including a picture gate, mounted within the case, a translucent screen adapted to be supported in a general vertical plane from a part of the case when the latter is open for use, a first mirror disposed opposite and at an inclination to the plane of the picture gate, a second mirror disposed at right angles to the first mentioned mirror and in a position to reflect light therefrom on to the back of said translucent screen, a movable structure within the casing including two alternative optical systems for the projector each of which optical systems can be brought into register with the picture gate and one of said optical systems being a short focus system adapted to project light emerging through the picture gate on to the first mentioned mirror, and the other of said optical systems being a longer focus system adapted to project light emerging through the picture gate along a path which is offset from and avoids said first mentioned mirror and passes through the aperture in the wall of the case on to a separate screen distant from the case.

5. Picture projection apparatus comprising a portable case having an apertured wall and including a lid movable between open and closed positions, a picture projector including a picture gate, mounted within the case, a translucent screen adapted to be supported in a general vertical plane from a part of the case when the latter is open for use, a first mirror disposed opposite and at an inclination to the plane of the picture gate, a second mirror disposed at right angles to the first mentioned mirror and in a position to reflect light therefrom on to the back of said translucent screen, a movable structure within the casing including two alternative optical systems for the projector each of which optical systems can be brought into register with the picture gate and one of said optical systems being a short focus system adapted to project light emerging through the picture gate on to the first mentioned mirror, and the other of said optical systems being a longer focus system including at its emergent end two totally reflecting prisms arranged with their hypotenuse faces towards and parallel with one another and overlapping so that light totally reflected by one of said prisms enters and is totally reflected by the other prism and is projected thereby, over a path which is offset from the optical path between the picture gate and the incident end of said second optical system, through the aperture in the wall of the case.

6. Picture projection apparatus comprising a portable case including a movable lid, a picture projector including an apertured platform mounted within the case at one end thereof, a light source within the case and disposed beneath said platform, a picture gate mounted above said platform, a totally reflecting prism disposed above the aperture in said platform, said prism being adapted to cause light from the light source to be diverted into and pass through said picture gate, a translucent screen adapted to be supported in a general vertical plane from a part of the case when the latter is open for use, a plurality of successively reflecting mirrors in the optical path between said picture gate and the back of the translucent screen, and a movable structure including alternative optical systems for the projector, said structure being movable between two set positions within the casing in one of which pictures may be projected by one optical system over the mirror path on to the back of the translucent screen and in the other of which pictures may be projected by the other optical system through an aperture in the wall of the case onto a separate screen distant from the case.

7. Picture projection apparatus comprising a portable case having an apertured wall and including a lid movable between open and closed position, a picture projector including a film gate, mounted within the case, a translucent screen adapted to be supported in a general vertical plane from a part of the case when the latter is open for use, a plurality of mirrors disposed within the case and adapted to form a mirror light path between the film gate of the projector and the back of the translucent screen when the latter is disposed in said supported position, film spool supports adapted to support the spools for rotation in horizontal planes at each side of the film gate, means for feeding a film horizontally and in a vertical plane, a movable structure within the casing including two alternative optical systems for the projector, each of which optical systems can be brought into register with the film gate and one of said optical systems being adapted to project light emerging through the film gate on to the mirror path leading to the translucent screen and the other optical system including means to divert light emerging from the film gate into a path which is offset from and avoids said first mentioned mirror light path and passes through the aperture in the wall of the case on to a separate screen distant from the case, means, in that optical system adapted to project light on to the mirror path leading to said transulcent screen, for rotating the images through 90° in the image plane, and means in said other optical system, said means comprising, at the emergent end of said optical system, two totally reflecting prisms arranged with their hypotenuse faces towards and parallel with one another and overlapping so that light totally reflected by one of said prisms enters and is totally reflected by the other prism and is thereby projected through the aperture in the wall of the case, over a path which is offset from the optical path between the film gate and the incident end of the first mentioned optical system, the second of said totally reflecting prisms being rotated in the hypotenuse plane relative to the first prism through an angle of 45° so that the images are rotated through 90° in the image plane.

8. Picture projection apparatus comprising a portable case having an apertured wall and including a lid movable between open and closed positions, a picture projector including a picture gate, mounted within the case, a translucent screen adapted to be supported in a general vertical plane from a part of the case when the latter is open for use, a mirror disposed within the case and adapted to form a mirror light path between the picture gate of the projector and the back of the translucent screen when the latter is disposed in said supported position, and a movable structure within the casing including two alternative optical systems for the projector, each of which optical systems can be brought into register with the picture gate and one of said optical systems being adapted to project light emerging through the picture gate on to the mirror path leading to the translucent screen and the other optical system including means to divert light emerging from the picture gate into a path which is offset from and avoids said first mentioned mirror light path and passes through the aperture in the wall of the case on to a separate screen distant from the case.

ARTHUR WILLIAM KINGSTON.

REFERENCES CITED

The following references are of record in the file of this patent:

UNITED STATES PATENTS

| Number | Name | Date |
| --- | --- | --- |
| 1,447,403 | Atherton | Mar. 6, 1923 |
| 1,551,259 | Merriman | Aug. 25, 1925 |
| 1,934,582 | Bausch et al. | Nov. 7, 1933 |
| 1,988,522 | Stanley | Jan. 22, 1935 |
| 2,064,368 | Bausch et al. | Dec. 15, 1936 |
| 2,230,573 | Mestre | Feb. 4, 1941 |
| 2,265,992 | Beck | Dec. 16, 1941 |
| 2,322,023 | Hopkins | June 15, 1943 |
| 2,424,339 | Stechbart et al. | July 22, 1947 |